US009396888B1

(12) United States Patent
Yeckley

(10) Patent No.: US 9,396,888 B1
(45) Date of Patent: Jul. 19, 2016

(54) COPPER-ALUMINUM ELECTRICAL JOINT

(71) Applicant: Mitsubishi Electric Power Products, Inc., Warrendale, PA (US)

(72) Inventor: Russell Norman Yeckley, Murrysville, PA (US)

(73) Assignee: MITSUBISHI ELECTRIC POWER PRODUCTS, INC., Warrendale, PA (US)

( * ) Notice: Subject to any disclaimer, the term of this patent is extended or adjusted under 35 U.S.C. 154(b) by 0 days.

(21) Appl. No.: 14/611,435

(22) Filed: Feb. 2, 2015

(51) Int. Cl.
*H01H 9/02* (2006.01)

(52) U.S. Cl.
CPC ........................ *H01H 9/02* (2013.01)

(58) Field of Classification Search
CPC .............. H01H 2033/6613; H01H 2033/6623; H01H 2009/526
See application file for complete search history.

(56) References Cited

U.S. PATENT DOCUMENTS

| 3,555,491 | A | | 1/1971 | Mess |
| 3,681,506 | A | | 8/1972 | Can |
| 3,699,497 | A | | 10/1972 | Cooper, Jr. et al. |
| 3,745,284 | A | * | 7/1973 | Hosokawa ............. H01H 33/91 218/61 |
| 3,769,551 | A | | 10/1973 | Corman et al. |
| 3,983,345 | A | * | 9/1976 | Phillips ................. H01H 33/668 218/122 |
| 4,005,297 | A | | 1/1977 | Cleaveland |
| 4,046,054 | A | | 9/1977 | Gulistan |
| 4,123,618 | A | | 10/1978 | Cushing et al. |
| 4,126,618 | A | * | 11/1978 | Winter .................. C07D 213/32 546/261 |
| 4,202,591 | A | | 5/1980 | Borgstrom |
| 4,207,446 | A | * | 6/1980 | Sasaki .................... H01H 33/16 218/79 |
| 4,266,841 | A | | 5/1981 | Sherwood |
| 4,748,304 | A | | 5/1988 | Soboul |
| 5,041,004 | A | | 8/1991 | Waldorf |
| 6,198,062 | B1 | * | 3/2001 | Mather ................ H01H 33/022 218/120 |

(Continued)

FOREIGN PATENT DOCUMENTS

DE 19836196 2/1999
JP 2012-059436 3/2012

OTHER PUBLICATIONS

Davet, G. P., "Using Belleville Springs to Maintain Bolt Preload", 1997, pp. 1-30.

(Continued)

*Primary Examiner* — Truc Nguyen
(74) *Attorney, Agent, or Firm* — One LLP

(57) ABSTRACT

A circuit breaker, or transformer, or insulated bus for use with AC voltages greater than 30 kilovolts and AC currents greater than 400 amperes includes an elongated bushing made from electrically insulating material and having first and second ends. The first end of the bushing is coupled to a main enclosure of the circuit breaker, or transformer, or insulated bus and a terminal pad is coupled to the second end of the bushing. A conductor is disposed in an internal cavity of the bushing in spaced relation to an internal wall of the bushing that defines the internal cavity. The conductor includes first and second segments. A first end of the first segment is electrically connected to a contact of the circuit breaker, or transformer, or insulated bus and a first end of the second segment is electrically connected to the terminal pad. Second ends of the first and second segments are coupled together with a biasing element interposed between the second ends of the first and second segments. The biasing element is operative for biasing the first end of the first segment toward the contact and for biasing the first end of the second segment toward the one terminal pad.

14 Claims, 13 Drawing Sheets

(56) References Cited

U.S. PATENT DOCUMENTS

| | | |
|---|---|---|
| 6,510,047 B2 | 1/2003 | Meiners et al. |
| 7,056,132 B1 | 6/2006 | Berglund et al. |
| 7,993,169 B1 | 8/2011 | Hoxha |
| 8,278,582 B2 | 10/2012 | Tu et al. |
| 8,328,569 B2 | 12/2012 | Roscizewski et al. |
| 8,963,037 B2 * | 2/2015 | Nakada .................. H01H 33/42 218/120 |
| 2005/0115927 A1 | 6/2005 | Kagawa |
| 2007/0151953 A1 * | 7/2007 | Meinherz ................. H02B 5/06 218/155 |
| 2008/0000879 A1 | 1/2008 | Steffens et al. |
| 2012/0160810 A1 * | 6/2012 | Ohtsuka ............. H02B 13/0354 218/140 |
| 2014/0076851 A1 * | 3/2014 | Yano ..................... H01H 33/40 218/120 |

OTHER PUBLICATIONS

"Stacking Disc Springs, Helpful hints and tips", retrieved from http://www.bellevillesprings.com/stacking-disc-springs.html on Oct. 6, 2014.

* cited by examiner

COPPER-ALUMINUM ELECTRICAL JOINT

BACKGROUND OF THE INVENTION

1. Field of the Invention

The present invention relates to circuit breakers utilized with AC voltages greater than 30 kilovolts and AC currents greater than 400 amperes and, more specifically, to dissipating heat associated with the operation of said circuit breakers and for improving the reliability of electrical connections of multi-segment conductors disposed inside bushings of the circuit breakers.

2. Description of Related Art

An exemplary three-phase, mechanically ganged, sulfur hexafluoride ($SF_6$) gas insulating circuit breaker system includes a plurality of circuit breakers. Each circuit breaker includes a main enclosure which houses an interrupter Each circuit breaker also includes a pair of insulating bushings having first ends coupled to the main enclosure and having second ends coupled to line terminals.

As electrical current flows through such circuit breaker, the temperature of the enclosed gas increases due to the heat generated from the resistivity of the conductive parts. The warm gas tends to rise and stagnate at the highest point, which is usually just below the line terminals at the tops of the bushings.

It would be desirable to provide a means that facilitates the removal of heat from the warm gas at the top of the bushings.

SUMMARY OF THE INVENTION

Disclosed herein is a circuit breaker for use with AC voltages greater than 30 kilovolts and AC currents greater than 400 amperes. The circuit breaker comprises: a main enclosure housing an interrupter that is electrically insulated from the main enclosure, wherein the interrupter is switchable between a closed state where first and second contacts of the interrupter are electrically connected defining a conductive path for current to flow between the first and second contacts and an open state where the first and second contacts of the interrupter are electrically isolated from each other, and vice versa; first and second electrically insulating bushings having proximal ends coupled to the main enclosure; first and second conductors disposed inside of the first and second bushings, wherein proximal ends of the first and second conductors are electrically connected to the first and second contacts of the interrupter defining a conductive path for current to flow between the first and second contacts and the first and second conductors, respectively; first and second terminal pads coupled between distal ends of the first and second bushings and distal ends of the first and second conductors disposed inside of the first and second bushings, respectively; and first and second extruded radiators coupled between the distal ends of the first and second bushings and the first and second terminal pads, respectively, wherein portions of the first and second conductors are disposed inside of the first and second extruded radiators.

The inside of each bushing can include a cavity defined by an interior wall of the bushing. Each conductor can be disposed in the cavity of one of the bushings in spaced relation to the interior wall of the bushing.

The interrupter and the first and second conductors can be exposed to an electrically insulating gas that is disposed in the main enclosure and the insides of the bushings and the extruded radiators.

The inside of each extruded radiator can include includes a cavity defined by an interior wall of the extruded radiator that is in spaced relation with the portion of one of the first and second conductors.

An outside (or exterior) of each extruded radiator can include one or more fins.

A subset of the fins (i.e., all or a portion of the fins) of each extruded radiator can include internally threaded holes that are configured to mate with externally threaded bolts to couple the extruded radiator to the distal end of one of the bushings, to one of the terminal pads, or to both.

A distal end of the one of the bushings can include includes a flange adjacent the bushing's distal end. The externally threaded bolts can couple the extruded radiator to the distal end of the one bushing via the flange.

Each extruded radiator can be coupled to either the distal end of one of the bushings or to one of the terminal pads via an interface plate that is coupled to the extruded radiator.

The interface plate can be coupled to the extruded radiator via welding.

Each extruded radiator can be coupled to first and second interface plates. The first interface plate of each extruded radiator can also be coupled to the distal end of one of the bushings. The second interface plate of each extruded radiator can also be coupled to one of the terminal pads.

The first interface plate can be coupled to the distal of the said bushing via a flange disposed adjacent the bushing's distal end.

The first and second interface plates can be coupled to the distal end of the bushing and the terminal pad, respectively, via externally threaded bolts mating with one or more patterns of internally threaded holes in the extruded radiator.

Each interface plate can be coupled to the extruded radiator via welding.

Each extruded radiator can be formed from aluminum.

Also disclosed herein is a circuit breaker, or transformer, or insulated bus for use with AC voltages greater than 30 kilovolts and AC currents greater than 400 amperes. The circuit breaker, or transformer, or insulated bus comprises: an elongated bushing made from electrically insulating material and having first and second ends, the first end of the bushing adapted to be coupled to a main enclosure; an elongated extruded radiator having first and second ends, wherein the first end of the extruded radiator is coupled to the second end of the bushing; a terminal pad coupled to the second end of the extruded radiator; and a conductor disposed in internal cavities of the bushing and the extruded radiator in spaced relation to internal walls of the bushing and the extruded radiator that define the internal cavities, wherein one end of the conductor is electrically connected to the terminal pad.

The extruded radiator can include one or more fins. A subset of the fins (i.e., all or a portion of the fins) can include internally threaded holes that are configured to mate with externally threaded bolts to couple the extruded radiator to the second end of bushing, to the terminal pad, or to both.

A first interface plate can be coupled between the first end of the extruded radiator and the second end of the bushing. A second interface plate can be coupled between the terminal pad and the second end of the extruded radiator.

The extruded radiator and the first and second interface plates can be coupled together to form a singular, unified piece.

Threaded bolts can be used to couple the second end of the bushing and the terminal pad to the respective first and second interface plates.

Adjacent the second end of the bushing a flange can be provided that is used to couple the first end of the extruded radiator to the second end of the bushing.

Also disclosed herein is a circuit breaker for use with AC voltages greater than 30 kilovolts and AC currents greater than 400 amperes. The circuit breaker comprises: a main enclosure housing an interrupter that is electrically insulated from the main enclosure, wherein the interrupter is switchable between a closed state where first and second contacts of the interrupter are electrically connected defining a conductive path for current to flow between the first and second contacts and an open state where the first and second contacts of the interrupter are electrically isolated from each other, and vice versa; first and second electrically insulating bushings having proximal ends coupled to the main enclosure; first and second conductors disposed inside of the first and second bushings, wherein proximal ends of the first and second conductors are electrically connected to the first and second contacts of the interrupter defining a conductive path for current to flow between the first and second contacts and the first and second conductors, respectively; and first and second terminal pads coupled between distal ends of the first and second bushings and distal ends of the first and second conductors disposed inside of the first and second bushings, respectively, wherein: at least one conductor includes first and second segments; a first end of the first segment is electrically connected to one of the contacts of the interrupter; a first end of the second segment is electrically connected to one of the terminal pads; a second end of the first segment is coupled to a second end of the second segment; and a biasing element is interposed between the second ends of the first and second segments, wherein the biasing element is operative for biasing the first end of the first segment toward the contact of the interrupter and for biasing the first end of the second segment toward the one terminal pad.

First and second radiators can be coupled between the distal ends of the first and second bushings and the first and second terminal pads, respectively. At least a portion of the first or second segment of the one conductor can be disposed inside one of radiators The second ends of the first and second segments can be coupled together via male threads of one segment threadedly engaged in female threads of the other segment.

One segment can be made from aluminum. The other segment can be made from copper. At least one of the male threads and the female threads can be coated with a conductive plating, e.g., silver, copper, or tin plated.

The first end of the first segment can be coupled directly to the contact of the interrupter. The first end of the second segment can be coupled directly to the one terminal pad.

The biasing element can include a Belleville washer (also known as a coned-disc spring, a conical spring washer, a disc spring, a Belleville spring, a frustoconical spring washer, or a cupped spring washer) or a coiled spring.

The biasing element can include a pair of Belleville washers connected in series or in parallel.

At least one conductor can further include a third segment coupled with the first segment, with the second segment, or with both of the first and second segments.

Lastly, disclosed herein is a circuit breaker, or transformer, or insulated bus for use with AC voltages greater than 30 kilovolts and AC currents greater than 400 amperes. The circuit breaker, or transformer, or insulated bus comprises: an elongated bushing made from electrically insulating material and having first and second ends, the first end of the bushing coupled to a main enclosure; a terminal pad coupled to the second end of the bushing; and a conductor disposed in an internal cavity of the bushing in spaced relation to an internal wall of the bushing that defines the internal cavity, wherein: the conductor includes first and second segments; a first end of the first segment is electrically connected to a contact; a first end of the second segment is electrically connected to the terminal pad; a second end of the first segment is coupled to a second end of the second segment; and a biasing element is interposed between the second ends of the first and second segments, wherein the biasing element is operative for biasing the first end of the first segment toward the contact and for biasing the first end of the second segment toward the terminal pad.

An elongated radiator can be disposed between the second end of the bushing and the terminal pad. At least a portion of the first or second segment of the conductor can be disposed inside of the radiator.

The second ends of the first and second segments can be coupled together via male threads of one segment threadedly engaged in female threads of the other segment.

One segment can be made from aluminum. The other segment can be made from copper. At least one of the male threads and the female threads can be coated with a conductive plating, e.g., silver, copper, or tin plated.

The first end of the first segment can be coupled directly to the contact. The first end of the second segment can be coupled directly to the one terminal pad.

The biasing element can include a Belleville washer (also known as a coned-disc spring, a conical spring washer, a disc spring, a Belleville spring, a frustoconical spring washer, or a cupped spring washer) or a coiled spring.

The biasing element can include a pair of Belleville washers connected in series or in parallel.

The conductor can further include a third segment coupled with the first segment, with the second segment, or with both of the first and second segments.

DETAILED DESCRIPTION OF THE INVENTION

The present invention will now be described with reference to the accompanying figures where like reference numbers correspond to like or substantially similar elements. Herein, reference numbers followed by the suffix "–1" or "–2" are different instances of the element represented by the main reference number without the suffix. For example, two separate instances of bushing 14 are denoted by reference numbers 14-1 and 14-2.

Figure 1:
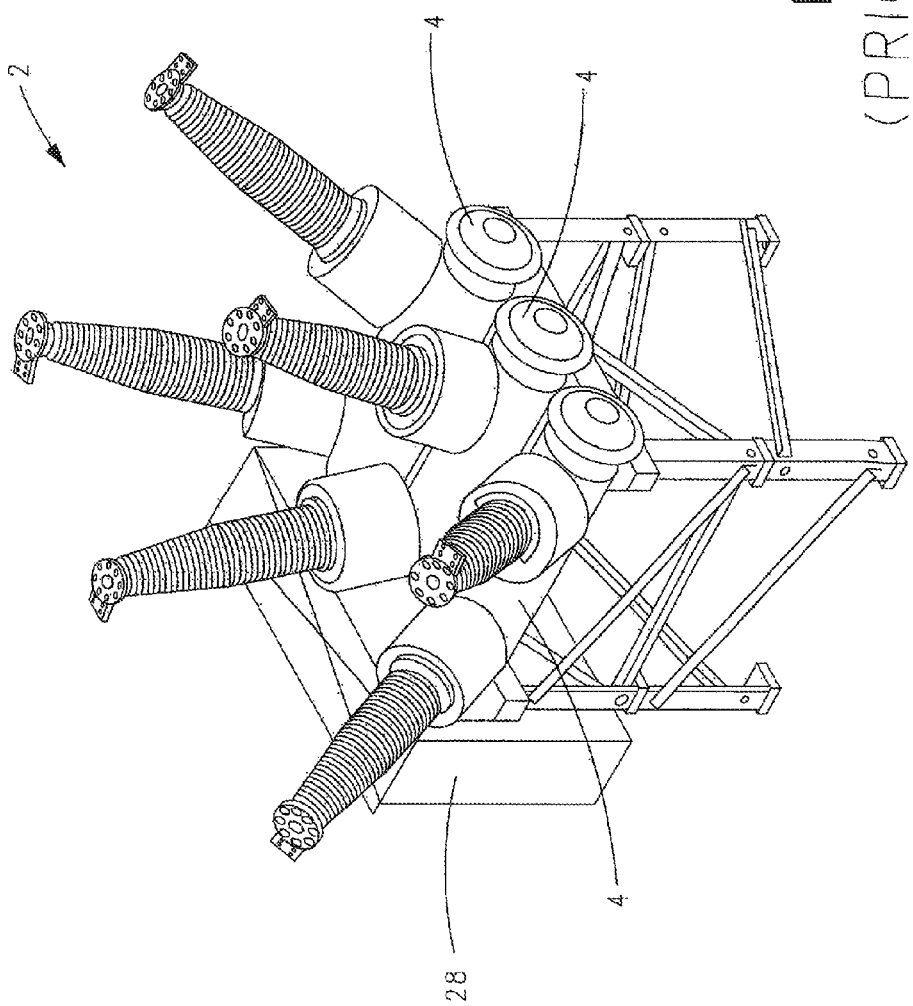
FIG. 1 is an isolated perspective view of a conventional circuit breaker system including three circuit breakers, each of which can be connected to a single phase of a three phase AC distribution system.

With reference to FIG. 1, an exemplary three-phase, mechanically ganged, sulfur hexafluoride ($SF_6$) gas insulating circuit breaker system 2 includes a plurality of circuit breakers 4. The number of circuit breakers 4 of circuit breaker system 2 is dictated by the number of electrical phases to be switched and controlled. For example, the exemplary circuit breaker system 2 shown in FIG. 1 includes three circuit breakers 4 for switching three phases of a three-phase AC distribution system. However, the number of circuit breakers 4 illustrated in FIG. 1 is not to be construed as limiting the invention.

Figure 2A:
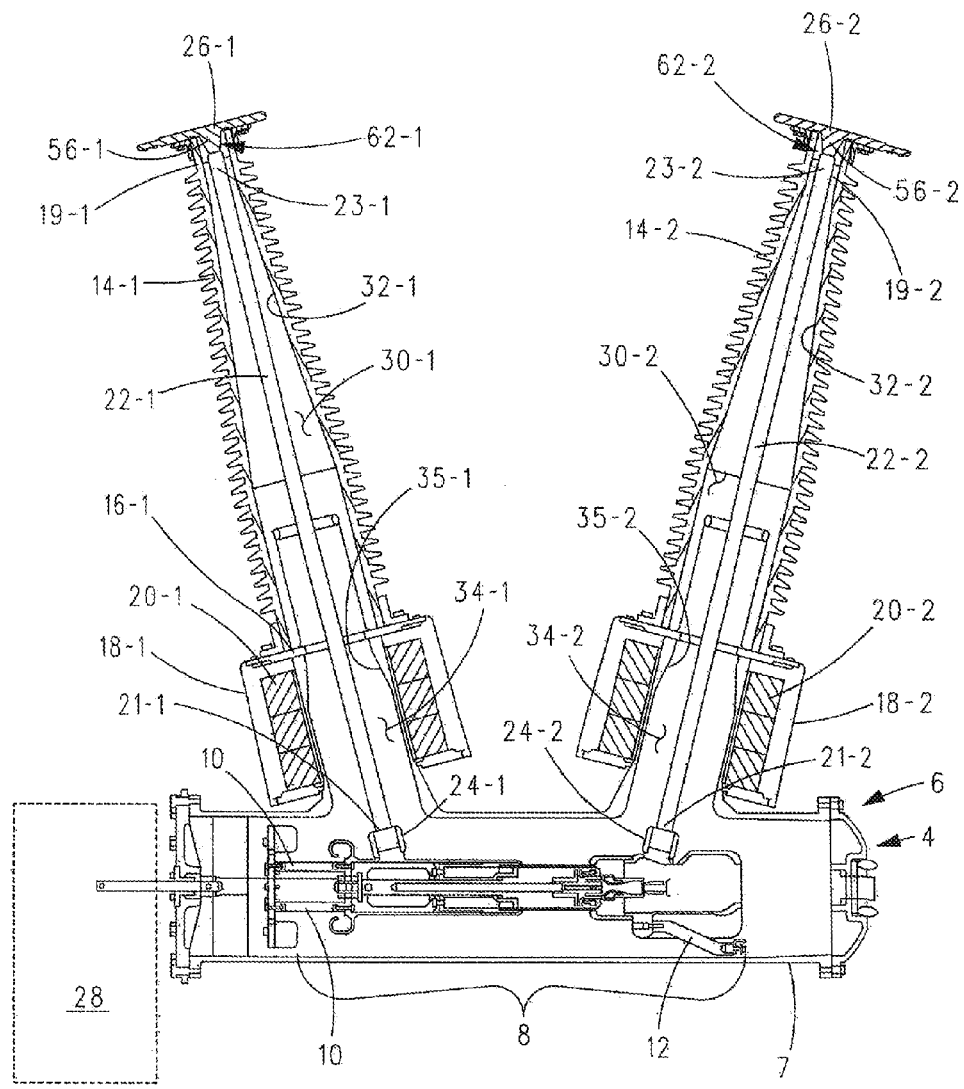
FIGS. 2A and 2B are cross-sectional views of one of the circuit breakers shown in FIG. 1 with the interrupter of the circuit breaker in closed and open states, respectively.

With reference to FIG. 2A and with continuing reference to FIG. 1, each circuit breaker 4 includes a main enclosure 6 which houses an interrupter 8 which is electrically isolated from main enclosure 6 by way of insulating standoffs 10 and 12. More specifically, main enclosure 6 includes a body 7 (which houses interrupter 8 and standoffs 10 and 12) and a pair of extensions (or arms) 35-1 and 35-2 which extend from body 7.

Each circuit breaker 4 also includes first and second insulating bushings 14-1 and 14-2 having proximal ends 16-1 and 16-2 coupled to distal ends of extensions 35-1 and 35-2. Current transformers 20-1 and 20-1 are mounted surrounding extensions 35-1 and 35-2 between insulating bushings 14-1 and 14-2 and body 7. Transformer housings 18-1 and 18-2 surround transformers 20-1 and 20-1 and aid in protecting transformers 20-1 and 20-1 from environmental conditions.

First and second conductors 22-1 and 22-2 are disposed inside of first and second bushings 14-1 and 14-2 and inside of extensions 35-1 and 35-2. Proximal ends 21-1 and 21-2 of first and second conductors 22-1 and 22-2 are coupled to first and second contacts 24-1 and 24-2 of interrupter 8 defining a conductive path for current to flow between first and second contacts 24-1 and 24-2 and first and second conductors 22-1 and 22-2, respectively.

Circuit breaker 4 also includes first and second terminal pads 26-1 and 26-2 coupled between distal ends 19-1 and 19-2 of first and second bushings 14-1 and 14-2 and distal ends 23-1 and 23-2 of first and second conductors 22-1 and 22-2 disposed inside of first and second bushings 14-1 and 14-2, respectively.

Figure 2B:
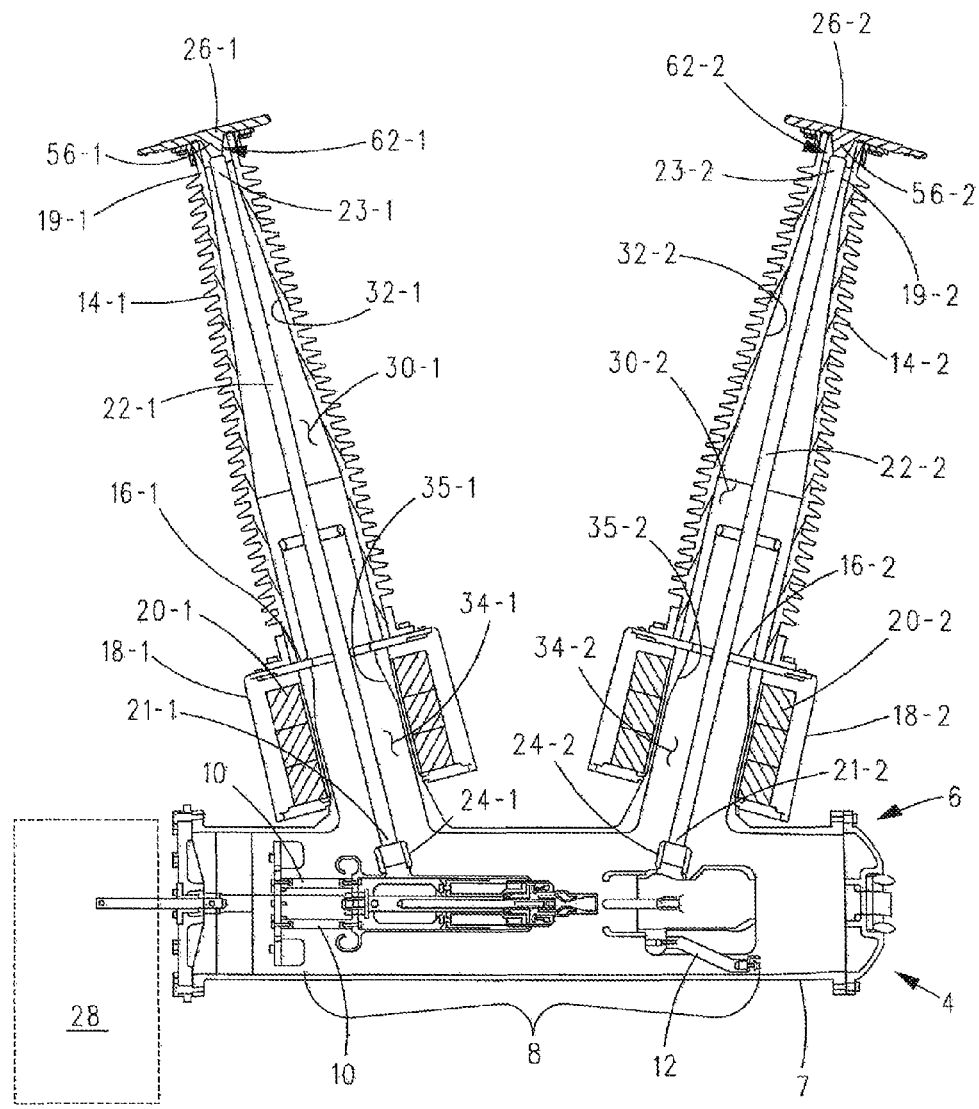

With reference to FIG. 2B and with continuing reference to FIGS. 1 and 2A, interrupter 2 is switchable via electrical and/or mechanical modules disposed in a housing 28 between the closed state shown in FIG. 2A where the first and second contacts 24-1 and 24-2 of interrupter 8 are electrically connected defining a conductive path for current to flow between the first and second contacts 24-1 and 24-2, and the open state shown in FIG. 2B where the first and second contacts 24-1 and 24-2 are electrically isolated from each other, and vice versa.

Each transformer 20 is positioned and configured to output an AC current corresponding to the AC current flowing in the corresponding conductor 22. The current output by each transformer 20 facilitates monitoring the operational status of circuit breaker 4 and invoicing for electrical power (KVA) provided via circuit breaker 4.

As can be seen in FIGS. 2A and 2B, the insides of bushings 14-1 and 14-2 include cavities 30-1 and 30-2 defined by interior walls 32-1 and 32-2 of bushings 14-1 and 14-2. Portions or sections of conductors 22-1 and 22-2 are disposed in cavities 30-1 and 30-2 in spaced relation to interior walls 32-1 and 32-2 of bushings 14-1 and 14-2, respectively. The insides of extensions 35-1 and 35-2 also define internal cavities 34-1 and 34-2 with portions or sections of conductors 22-1 and 22-2 disposed in cavities 34-1 and 34-2 in spaced relation to interior walls of extensions 35-1 and 35-2.

In use, interrupter 8 and first and second conductors 22-1 and 22-2 are exposed to an suitable electrically insulating fluid, such as, without limitation, $SF_6$ gas, that is disposed in body 7 and cavities 30-1, 30-2, 34-1, and 34-2.

Desirably, the electrically insulating fluid is sulfur hexafluoride ($SF_6$) which is an inert, non-toxic, odorless, non-flammable, and colorless gas. Alternatively, the use of an electrically insulating oil is envisioned. $SF_6$ has excellent arc quenching properties and exhibits exceptional thermal stability. $SF_6$ has exceptionally good insulating properties and, at atmospheric pressure, has 2.5 times the dielectric strength of air. At a gas pressure of 289.6 kPa (42 psig), $SF_6$ gas has a same dielectric strength as transformer oil.

$SF_6$ remains a gas without liquefying down to −34.4° C. (−30° F.) at gas pressures normally utilized in circuit breaker 4. The density of $SF_6$ is about five times that of air and heat transfer by free convection is 1.6 times that of air at atmospheric pressure and 2.5 times the value of air at 206.8 kPa (30 psig).

Arcing, which occurs during normal operation of circuit breaker 4, does not materially affect the insulating properties of the $SF_6$ gas. The solid arc decomposition products, observed as a fine grey powder, have equally good dielectric properties.

Housing 28 houses suitable and/or desirable electrical, mechanical, and/or software modules that facilitate the switching of interrupter 8 between the closed state shown in FIG. 2A and the open state shown in FIG. 2B, and vice versa. Housing 28 may also include suitable electrical, mechanical, and/or software modules for detecting and processing the voltage and/or current output by each transformer 20-1 and 20-2 and for forwarding an indication of said detected voltage and/or current to suitable processing means located remotely. Further details regarding the electrical, mechanical, and/or software modules included in housing 28 will not be discussed herein for the purpose of simplicity.

In operation of circuit breaker 4, terminal pads 26-1 and 26-2 are coupled to lines (not shown) of a single phase of an AC distribution system. In use, as electrical current flows through first terminal pad 26-1, first conductor 22-1, interrupter 8 in its closed state, second conductor 22-2, and second terminal pad 26-2, the temperature of the $SF_6$ gas enclosed inside of enclosure 6, housings 18-1 and 18-2, and bushings 14-1 and 14-2 increases. The warm $SF_6$ gas tends to rise and stagnate at the highest point, which is usually just below terminal pads 26-1 and 26-2 at the top of bushings 14-1 and 14-2.

Figure 3A:
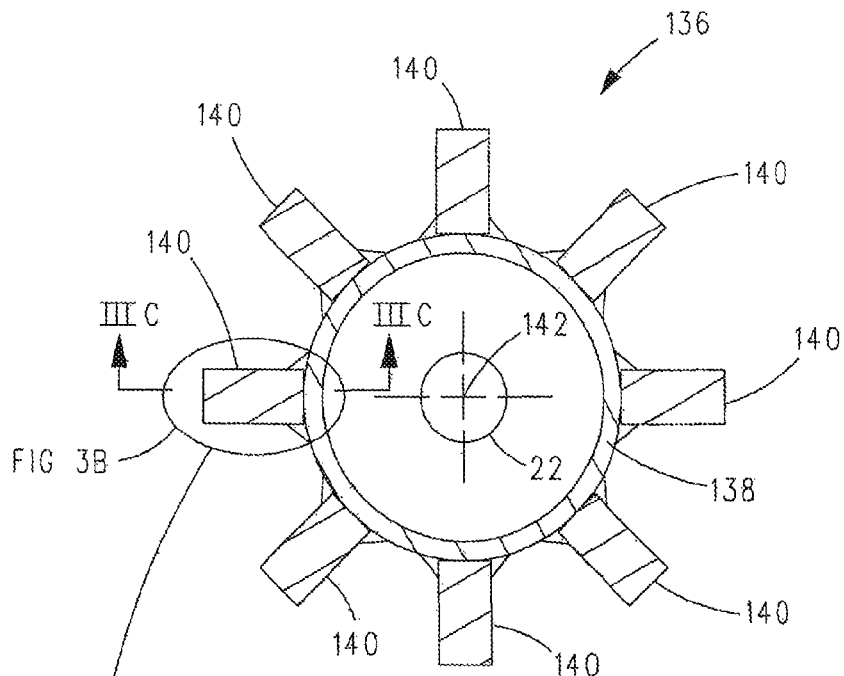
FIG. 3A is a cross-sectional plan view of an instance of a current solution radiator that can be coupled between the distal end of one of the bushings and a terminal pad of the circuit breakers shown in FIGS. 2A and 2B.
Figure 3B:
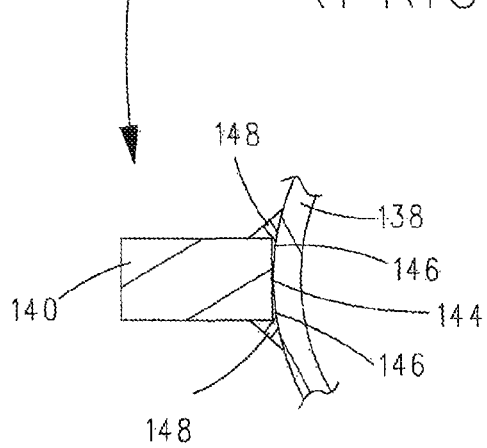
FIG. 3B is an enlarged isolated view of the connection of a single fin to the exterior of the tube portion of the radiator shown in FIG. 3A.
Figure 3C:
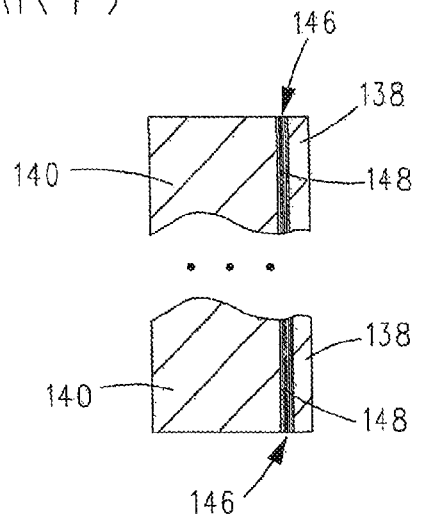
FIG. 3C is a section taken along lines IIIC-IIIC in FIG. 3A.

With reference to FIGS. 3A-3C and with continuing reference to FIGS. 1-2B, heretofore, as an aid to dissipating the heat in the $SF_6$ gas stagnating at the top of each bushing 14, a radiator 136 was disposed between the distal end 19 of the bushing 14 and the corresponding terminal pad 26. Radiator 136 included a tube 138 and a plurality of separately formed elongated fins 140 that are disposed (welded) around the exterior surface of tube 138. In the embodiment of radiator 136 shown in FIGS. 3A-3C, the longitudinal axis of each fin 140 extends parallel or substantially parallel to a central axis 142 of tube 138. In FIG. 3A, the central, longitudinal axis 142 of tube 138 extends normal (into) the surface of the page.

Each fin 140 is generally hexahedron-shaped (e.g., a right rectangular prism) having substantially planar sides and, desirably, the square or rectangular cross-section shown in FIGS. 3A-3B. As a result of this arrangement, each fin 140 had one planar side 144 that is mated with the curved exterior surface of tube 138 during the manufacturing of radiator 136 (see especially FIG. 3B). As can be understood from FIG. 3B, when the planar side 144 of a fin 140 is mated to the curved exterior surface of tube 138, one or more welds 148 and, possibly one or more gaps 146, will be present between planar side 144 and the curved exterior surface of tube 138. As would be readily understood, each such weld 148 and any gap 146 represents a discontinuity for the flow of heat between tube 138 and fin 140.

Interface plates or brackets (not shown) are utilized to couple the top end (shown in FIG. 3A) of radiator 136 to terminal pad 26 and to couple the bottom end (not shown in any of the figures) of radiator 136 to the distal end 19 of bushing 14. Additional details regarding radiator 136 shown in FIGS. 3A-3C and the coupling thereof between the distal end 19 of bushing 14 and the corresponding terminal pad 26 are not described herein for the purpose of simplicity.

The additional distance created between the distal end 19 of bushing 14 and the corresponding terminal pad 26 resulting from the addition of radiator 136 therebetween was accounted for by either increasing the length of conductor 22 or by adding an additional length of conductive segment (not shown in FIGS. 2A-3C) to either end of conductor 22.

Having thus described the current solution, first and second embodiments of the present invention will now be described.

Figure 4A:
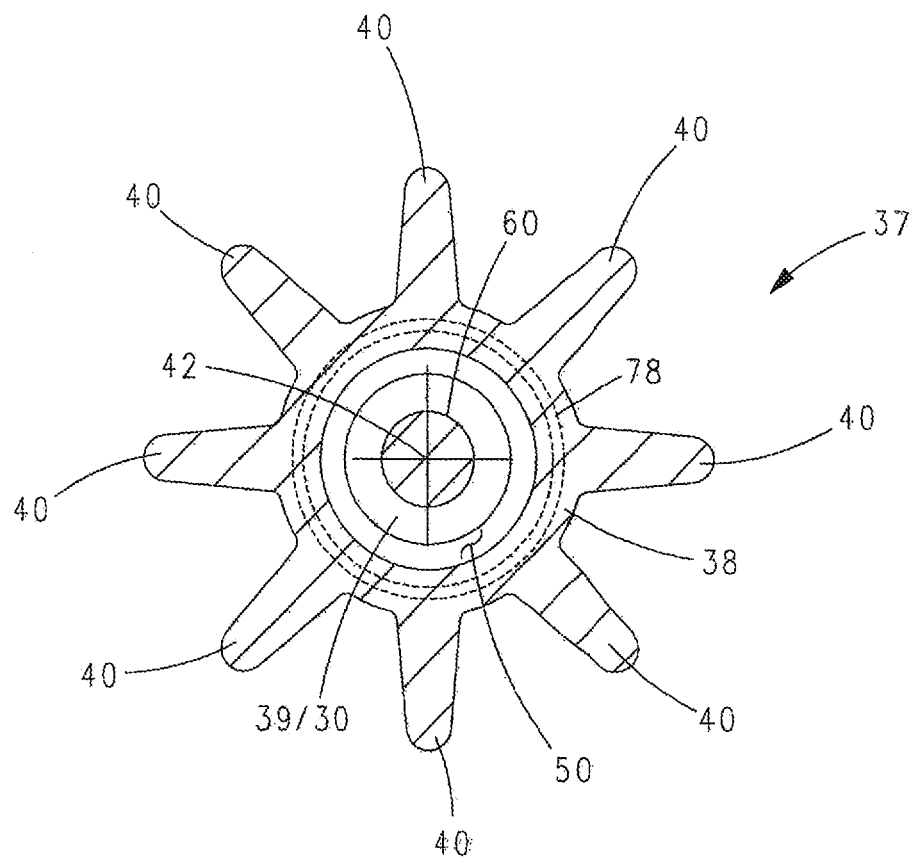
FIG. 4A is a section of an extruded radiator of a first embodiment radiator taken along lines IVA-IVA in FIG. 4C.
Figure 4B:
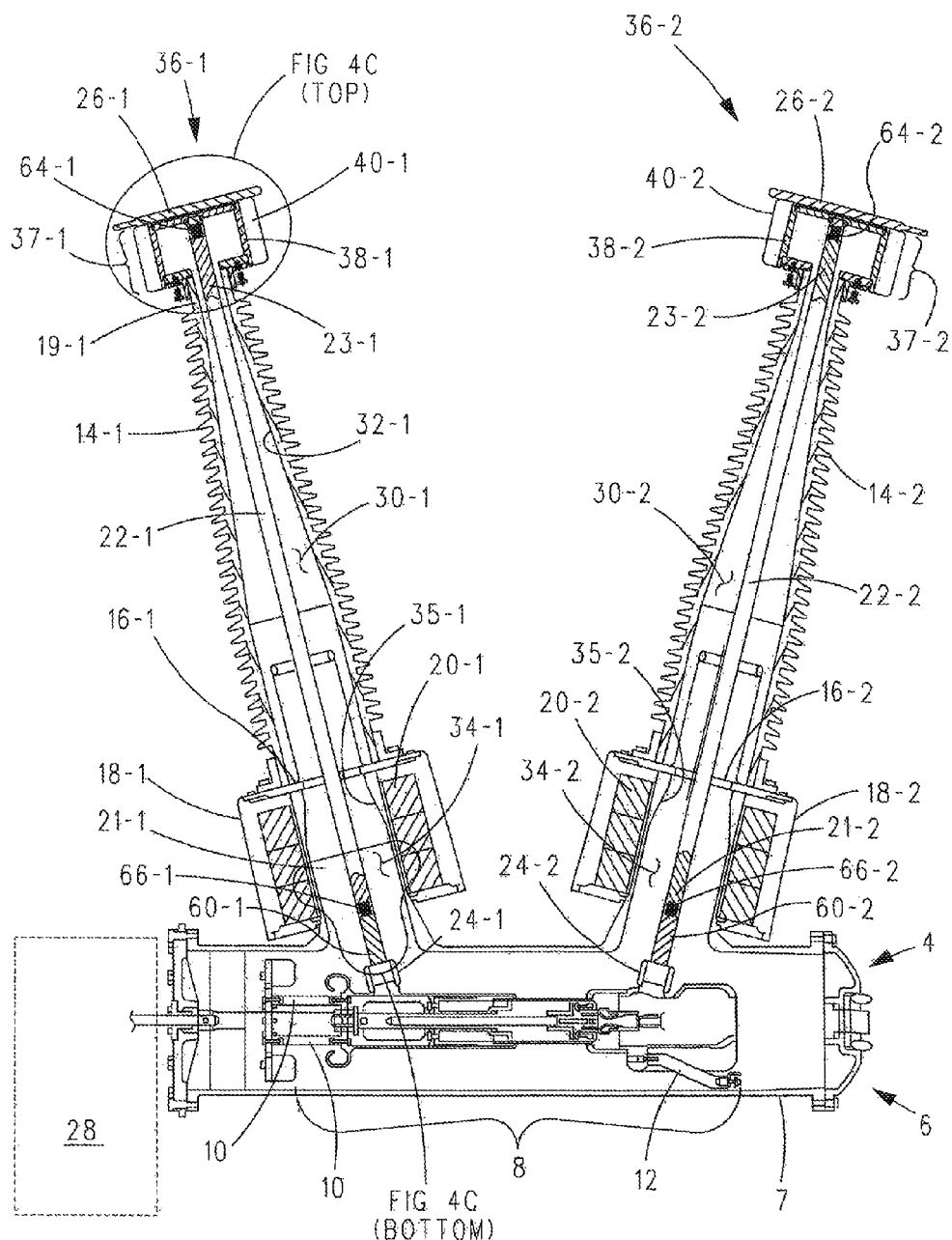
FIG. 4B is a section of the circuit breaker shown in FIG. 2A including between each bushing and each terminal pad a cross-section of the first embodiment radiator including the extruded radiator shown in FIG. 4A.
Figure 4C:
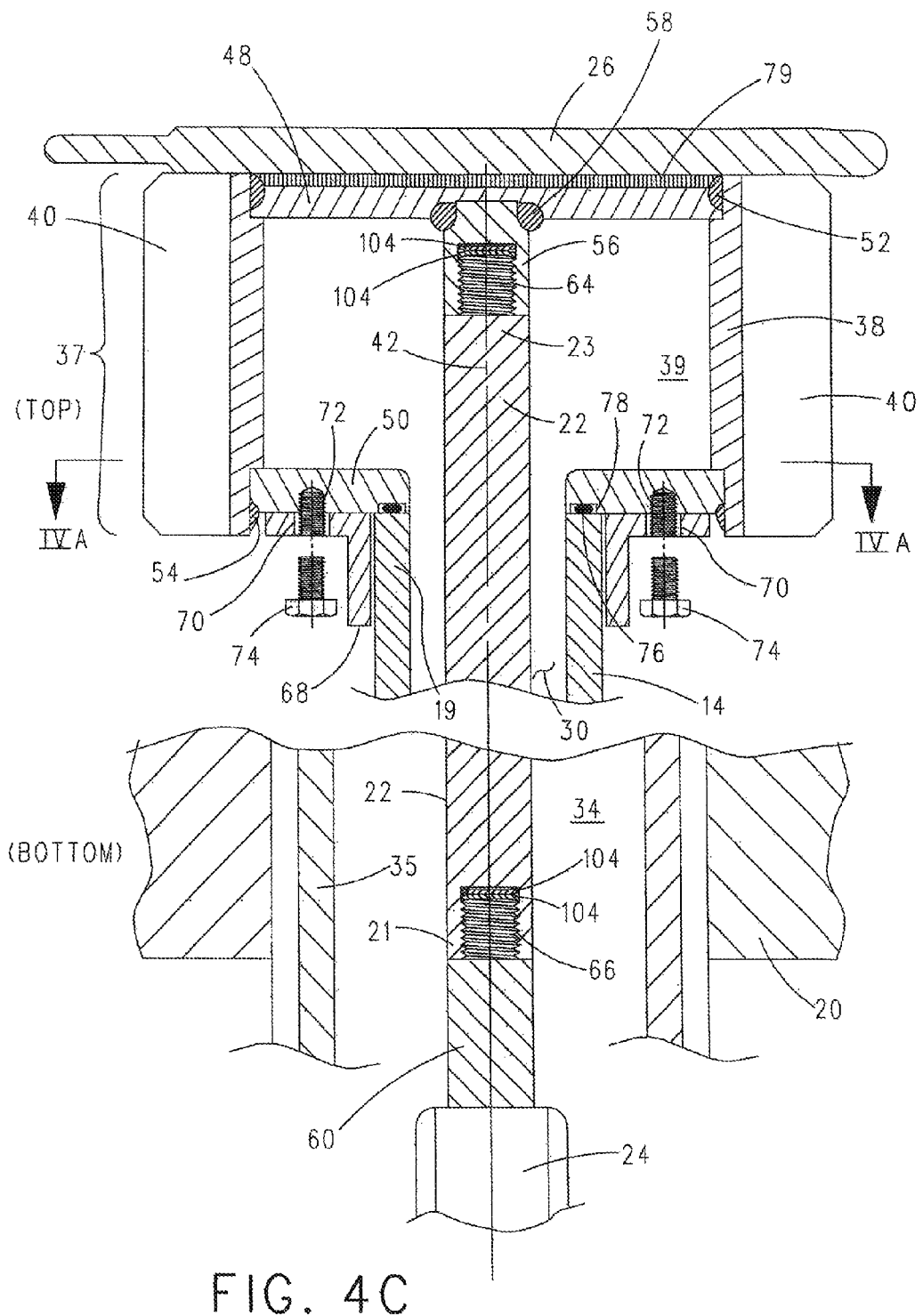
FIG. 4C is an enlarged, cross-section of the circled portion in FIG. 4B.

With reference to FIGS. 4A-4C, an instance of a first embodiment radiator 36 that can be disposed between the distal end 19 of each bushing 14 and the corresponding terminal pad 26 includes an extruded radiator 37 that includes a central tube segment or portion 38 and a plurality of radially extending, elongated fin segments or portions 40 integral with the exterior of tube segment 38. Desirably, the longitudinal axis of each fin segment 40 extends parallel or substantially parallel to a central axis 42 of tube segment 38. In FIG. 4A, the central, longitudinal axis 42 of tube segment 38 extends normal to (into) the surface of the page.

As shown best in FIG. 4A, the transition between tube segment 38 and each fin segment 40 is a smooth transition without gaps or welds, and the tip or end of each fin segment 40 is rounded. The absence of any gaps or welds between tube segment 38 and each fin segment 40 facilitates heat flow from the interior cavity 39 of tube segment 38 to each fin segment 40. Moreover, the rounded tip or end of each fin segment 40 facilitates uniform heat dissipation by avoiding the sharp edges of the fins 140 of the radiator 136 discussed above in connection with FIGS. 3A-3C.

With ongoing reference to FIGS. 4A-4C, each instance of first embodiment radiator 36 also includes a top plate 48 and a bottom plate 50 which are coupled to an interior surface of tube segment 38 at the top and bottom of tube segment 38. More specifically, the outside perimeter of top plate 48 is affixed to the interior surface of tube segment 38 at the top side of tube segment 38 via a weld 52. Similarly, the outside perimeter of bottom plate 50 is affixed to the interior surface of tube segment 38 at the bottom of tube segment 38 via a weld 54. Welds 52 and 54 desirably extend around the perimeter of top plate 48 and bottom plate 50, respectively.

A stub segment 56 secured to the bottom surface of top plate 48 via a weld 58 extends into the interior cavity 39 of tube segment 38. Stub segment 56 is coupled to the distal end 23 of conductor 22, which extends into the interior of tube segment 38 through a central opening in bottom plate 50, via a threaded coupling 64. As shown in FIGS. 4B and 4C, an extension segment 60 is coupled between the proximal end 21 of conductor 22 and contact 24. More specifically, one end of extension segment 60 is coupled to the proximal end 21 of a conductor 22 via a threaded coupling 66 and the other end of extension segment 60 is coupled to a contact 24 of interrupter 8 in a manner known in the art.

In FIG. 4C, threaded coupling 64 includes a male threaded segment of conductor 22 threadedly mated with a female threaded opening of stub segment 56. Threaded coupling 66 includes a female threaded opening of conductor 22 threadedly mated with a male threaded segment of extension segment 60. However, the particular arrangement of male threaded segments and female threaded openings comprising threaded couplings 64 and/or 66 is not to be construed as limiting the invention as it is envisioned that any suitable and/or desirable means of coupling the ends 23 and 21 of conductor 22 to stub segment 56 and extension segment 60 can be utilized. It is envisioned that the use of extension segment 60 with extruded radiator 37 is optional inasmuch as it is envisioned that, alternatively, the length of conductor 22 can be increased to account for the addition of extruded radiator 37 to the distal end 19 of bushing 14.

To facilitate the coupling of bottom plate 50 to the distal end 19 of bushing 14, a flange 68 is provided (welded) around the exterior of bushing 14 adjacent the distal end 19 of bushing 14. Flange 68 includes a pattern of through-holes 70 and bottom plate 50 includes a corresponding pattern of threaded holes 72 that are configured to be aligned with each other in use. At a suitable time after each through-hole 70 and a corresponding threaded hole 72 are aligned, the male threads of a threaded bolt 74 can be mated with the female threads of threaded hole 72 via through-hole 70 to secure bottom plate 50 to flange 68 and, hence, to the distal end 19 of bushing 14.

To avoid the escape of $SF_6$ gas at the point where bottom plate 50 is coupled to bushing 14, an O-ring 76 can be disposed in an annular groove 78 in the portion of the bottom surface of bottom plate 50 that comes into contact with the distal end 19 of bushing 14. When bottom plate 50 is secured to flange 68 via the threaded ends of bolts 74 threadedly received in through-holes 70 and threaded holes 72, O-ring 76 in annular groove 78 is compressed thereby avoiding the escape of $SF_6$ gas between the portion of the bottom surface of bottom plate 50 in contact with the distal end 19 of bushing 14. In FIG. 4C annular groove 78 is illustrated as being formed in bottom plate 50. However, this is not to be construed as limiting the invention since it is envisioned that annular groove 78 can be formed in the distal end 19 of bushing 14.

Desirably, extruded radiator 37 (including tube segment 38 and fins 40), top plate 48, bottom plate 50, and stub segment 56 are all made from the same material, e.g., aluminum, and extension segment 60 is made from another material, e.g., copper. However, this is not to be construed as limiting the invention. Also, as discussed above, each bushing 14 is formed from an insulating material, such as a ceramic, a composite material, or any other suitable and/or desirable insulating material. Furthermore, terminal pad 26 can also be made from a conductive material such as, without limitation, aluminum.

When an instance of first embodiment radiator 36 is utilized, terminal pad 26 can be welded to top plate 48 via a weld 79 as shown in FIG. 4C. However, this is not to be construed as limiting since it is envisioned that terminal pad 26 can be coupled to top plate 48 in any suitable and/or desirable manner.

Figure 5A:
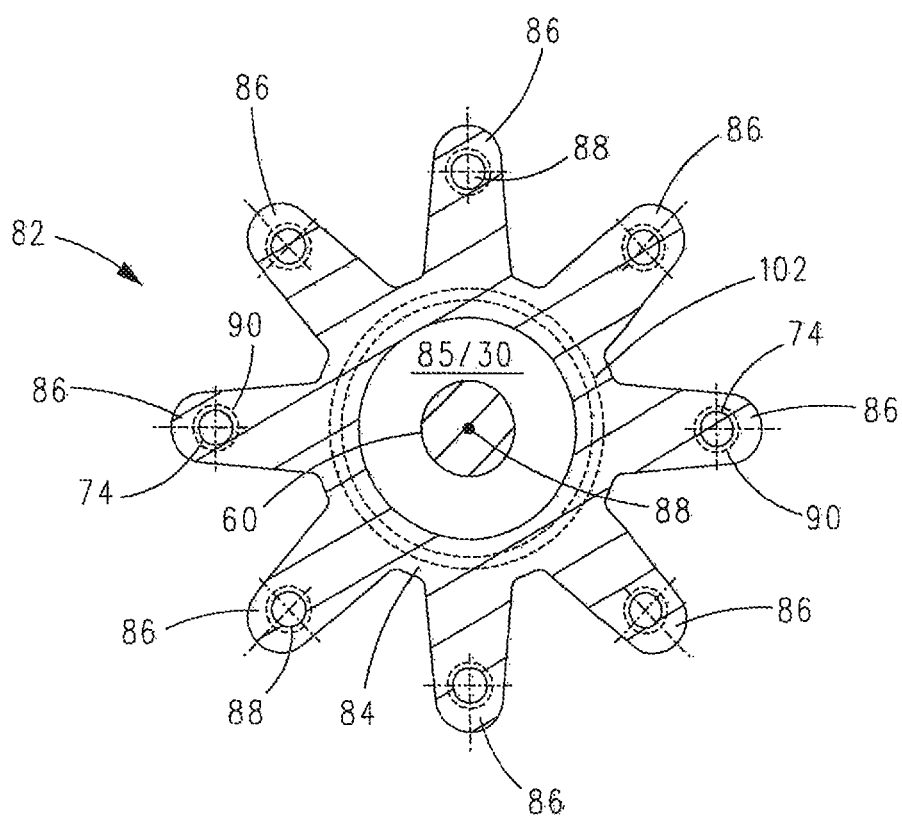
FIG. 5A is a section of an extruded radiator of a second embodiment radiator taken along lines VC-VC in FIG. 5C.
Figure 5B:
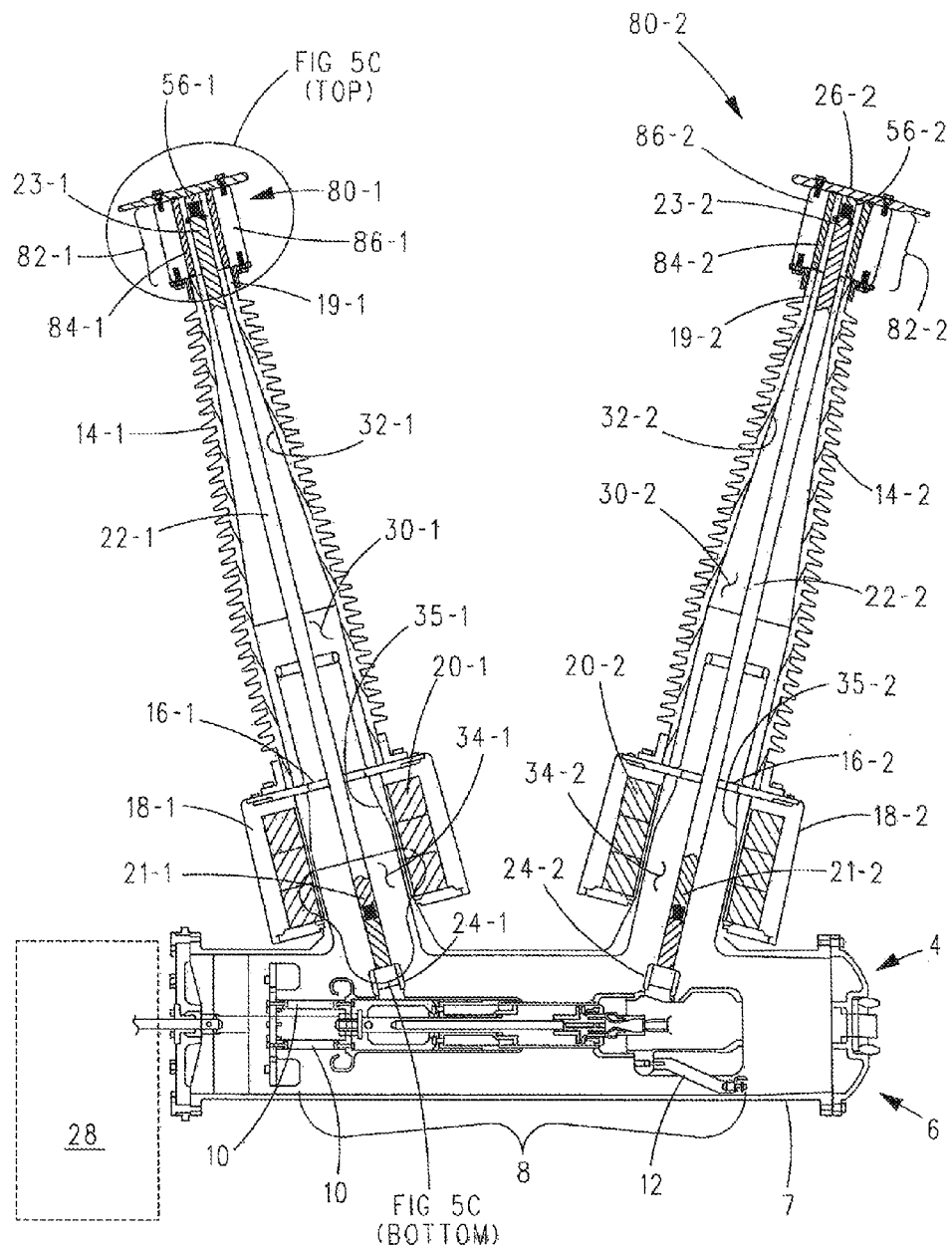
FIG. 5B is a section of the circuit breaker shown in FIG. 2A including between each bushing and each terminal pad a cross-section of the second embodiment radiator including the extruded radiator shown in FIG. 5A.
Figure 5C:
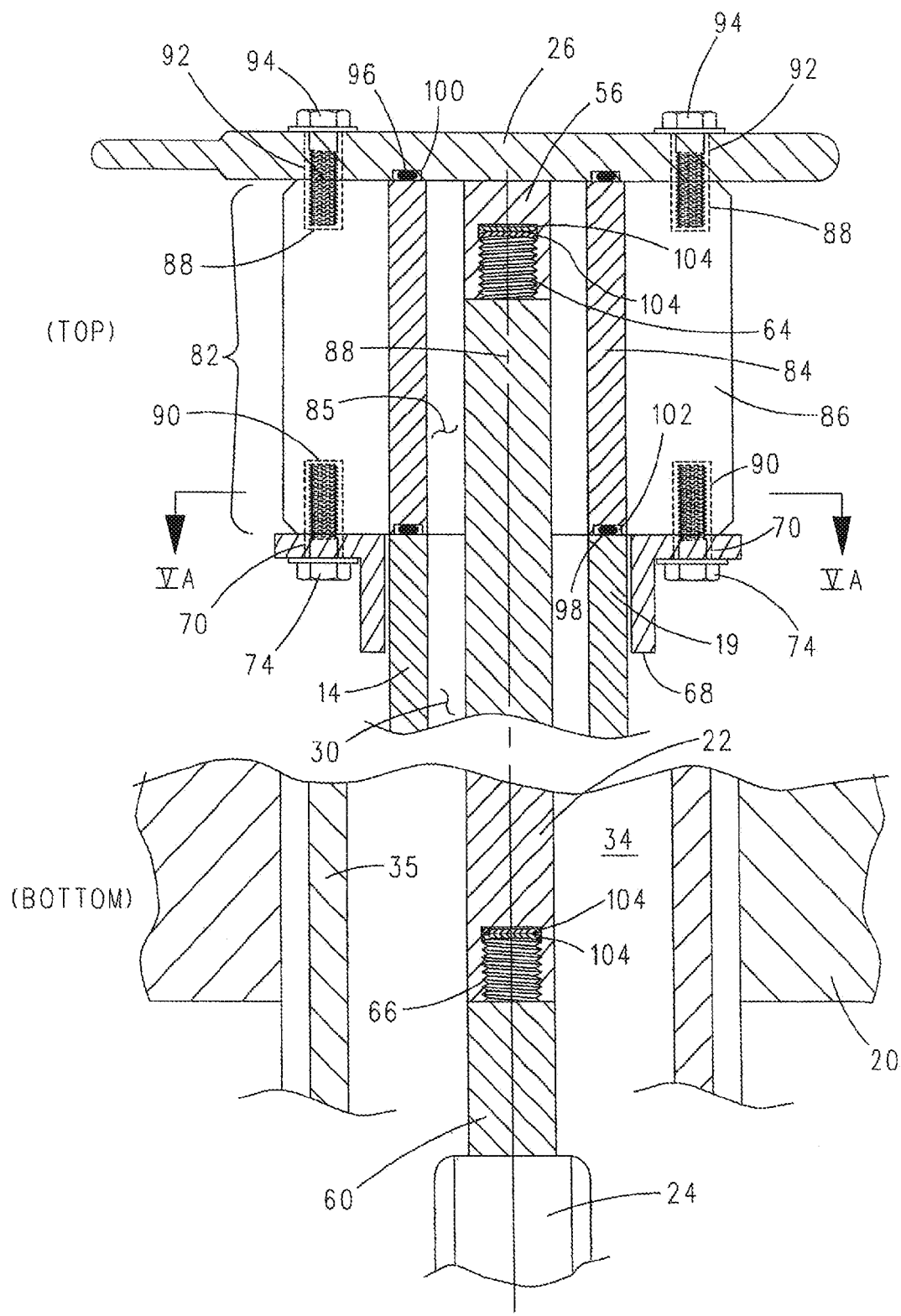
FIG. 5C is an enlarged cross-section of the circled portion in FIG. 5B.

With reference to FIGS. 5A-5C, an instance of a second embodiment radiator 80 that can be disposed between the distal end of each bushing 14 and the corresponding terminal pad 26 is an extruded radiator 82 that includes a tube segment or portion 84 and a plurality of radially extending, elongated fin segments or portions 86 integral with the exterior of tube segment 84. Desirably, the longitudinal axis of each fin segment 86 extends parallel or substantially parallel to a central axis 88 of extruded radiator 82. In FIG. 5A, the central, longitudinal axis of extruded radiator 82 extends normal to (into) the surface of the page.

As shown best in FIG. 5A, the transition between tube segment 84 and each fin segment 86 is a smooth transition without gaps or welds, and the tip or end of each fin segment 86 is rounded. The absence of any gaps or welds between tube segment 84 and each fin segment 86 facilitates heat flow from the interior cavity 85 of extruded radiator 82 to each fin segment 86. Moreover, the rounded tip or end of each fin segment 86 facilitates heat dissipation by avoiding the sharp edges of the fins 140 of radiator 136 discussed above in connection with FIGS. 3A-3C.

As can be seen by comparing FIGS. 4B and 5B, an instance of second embodiment radiator 80 can be used in place of an instance of first embodiment radiator 36 on the distal end 19 of a bushing 14. It is to be appreciated that the circuit breakers 4 shown in FIGS. 2A, 2B, 4B, and 5B are the same except for the alternate use of instances of the first and second embodiment radiators 36 and 80 for radiator 136 and the addition of an instance of extension segment 60 as a bridge between each contact 24 and the proximal end 21 of a conductor 22, which would normally be coupled together in the circuit breaker 4 shown in FIGS. 2A and 2B, but which are separated (or spaced apart) by the addition of first or second embodiment radiator 36 or 80 between bushing 14 and top plate 26 shown in FIGS. 4B and 5B.

With ongoing reference to FIG. 5C, a subset (all or less than all) of the fin segment(s) 86 of an instance of extruded radiator 82 can include threaded holes 88 and 90 at opposite ends of said fin segment 86. The pattern of threaded holes 90 of the fin segments 86 of extruded radiator 82 correspond to the pattern of through-holes 70 of flange 68 whereupon the pattern of through-holes 70 and the pattern of threaded holes 90 can be aligned with each other in use. Each threaded hole 90 is configured to threadedly receive the threaded end of a bolt 74 via one of the through-holes 70 in flange 68.

A terminal pad 26 that includes a pattern of through-holes 92 corresponding to the pattern of threaded holes 88 in the fin segments 86 of extruded radiator 82 can be coupled to an end of extruded radiator 82 opposite flange 68 via the threaded ends of bolts 94 engaging threaded holes 88 via through-holes 92 in terminal pad 26.

To avoid the escape of $SF_6$ gas at the points where the top of extruded radiator 82 is coupled to terminal pad 26 and the bottom of extruded radiator 82 is coupled to bushing 14, 0-rings 96 and 98 can be positioned in annular grooves 100 and 102. In FIG. 5C, annular grooves 100 and 102 are illustrated as being formed in the side of terminal pad 26 that is coupled to the top of extruded radiator 82 and in the end of tube segment 84 that contacts the distal end 19 of bushing 14. However, this is not to be construed as limiting the invention since it is envisioned that annular groove 100 can be formed in the end of tube segment 84 to be covered by terminal pad 26 and/or annular groove 102 can be formed in the distal end 19 of bushing 14.

As can be seen, the use of an instance of first embodiment radiator 36 or an instance of second embodiment radiator 80 between the distal end 19 of a bushing 14 and a terminal pad 26 facilitates the transfer of heat from the otherwise stagnant gas trapped inside cavities 39 and 85 of tube portions 38 and 84, respectively, and/or cavity 30 of bushing 14.

As can be seen in FIG. 4A, the fin segments 40 of extruded radiator 37 are integrally formed with tube segment 38, i.e., without any gaps or welds between each fin segment 40 and tube segment 38. Similarly, as shown in FIG. 5A, the fin segments 86 of extruded radiator 82 are integrally formed with tube segment 84, i.e., without any gaps or welds between each fin segment 86 and tube segment 84. By way of this arrangement, the heat flow discontinuity that results from gaps 146 and welds 148 between fin segments 140 and the curved or rounded exterior of tube 138 of radiator 136, shown in FIGS. 3A-3C, is avoided.

Referring back to FIGS. 4C and 5C, each threaded coupling 64 and 66 can include one or more internal Belleville washers 104 (or one or more coiled springs) between the base of the female threaded opening and the tip of the male threaded segment. Desirably, at least one of the male threads and the female threads of each threaded coupling 64 and 66 is plated with a suitable conductive material, such as silver, copper, or tin, that facilitates good electrical contact therebetween, especially under conditions where one or both of threaded couplings 64 and/or 66 is subject to extreme temperature variations normally attendant with the use of circuit breaker 4. When a threaded coupling 64 or 66 includes two or more Belleville washers 104, said Belleville washers 104 can be connected in series, in parallel, or in some combination of series and parallel as deemed suitable and/or desirable.

The one or more internal Belleville washers 104 (or one or more coiled springs) of each threaded coupling 64 and 66 act as a biasing means or biasing element that aids in maintaining the male threads and the female threads of each threaded coupling 64 and 66 in contact. The internal Belleville washers 104 (or coiled springs) associated with threaded coupling 66 also act to spring bias conductor 22 toward top plate 48 and to spring bias extension segment 60 toward contact 24. Similarly, the one or more internal Belleville washers 104 (or coiled springs) associated with threaded coupling 64 also act to spring bias conductor 22 toward contact 24.

While FIGS. 4C and 5C specifically illustrate one or more internal Bellville washers 104 associated with threaded coupling 64 and one or more internal Belleville washers 104 associated with threaded coupling 66, this is not to be construed as limiting the invention since it is envisioned that only a single set of one or more internal Belleville washers 104 (or one or more coiled springs) can be provided with threaded coupling 64 or threaded coupling 66, whereupon no Belleville washers 104 would be associated with the other threaded coupling. In this regard, it is envisioned that the use of one or more internal Belleville washers 104 (or one or more coiled springs) with threaded coupling 64 in combination one or more internal Belleville washers 104 (or one or more coiled springs) with threaded coupling 66 may be redundant.

Figure 6A:
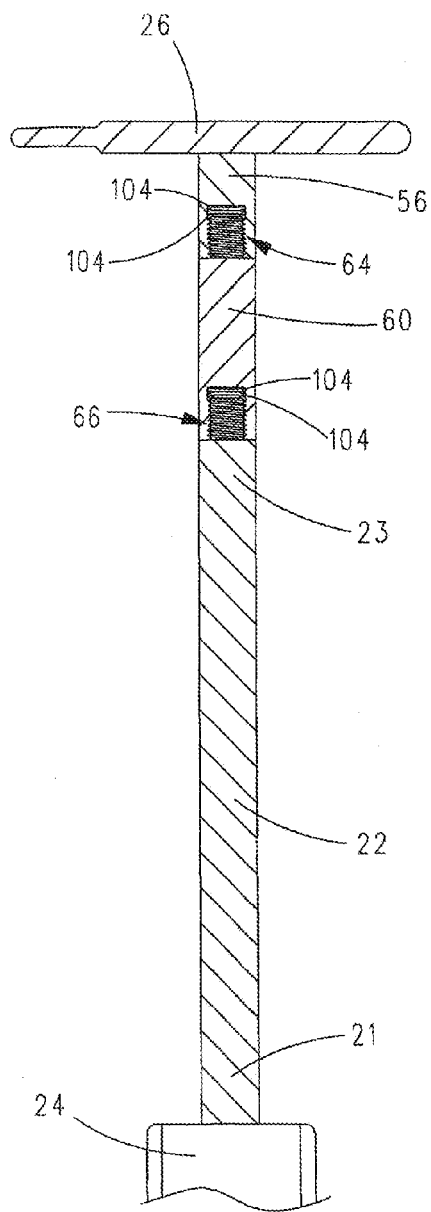
FIG. 6A is an alternate arrangement of the conductor and extension segment shown in FIGS. 4B, 4C, 5B, and 5C including one or more internal Belleville washers within each threaded coupling.

With reference to FIG. 6A, and with reference back to FIGS. 4A-5C, it is envisioned that the position of extension segment 60 between contact 24 and stub segment 56 can be changed whereupon extension segment 60 is coupled between the distal end 23 of conductor 22 and stub segment 56 via threaded couplings 64 and 66 while the proximal end 21 of conductor 22 is coupled directly to contact 24 in a manner known in the art.

Figure 6B:
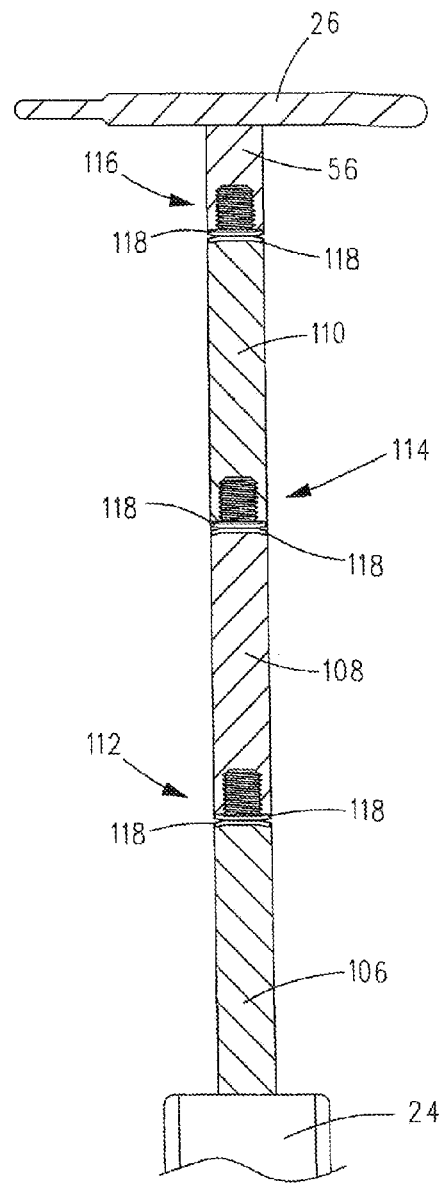
FIG. 6B is an alternate arrangement of conductor(s) and extrusion segment(s) shown in FIGS. 4B, 4C, 5B, and 5C including one or more external Belleville washers between each pair of adjacent segments.

With reference to FIG. 6B, also or alternatively, it is envisioned that three or more conductive segments 106, 108, and 110 can be coupled between stub segment 56 and contact 24 via threaded couplings 112, 114, and 116, each of which includes one or more external Belleville washers 118 (or one or more coiled springs), with the external Belleville washers 118 connected in series, in parallel, or in some combination of series and parallel, between each pair of adjacent segments 106, 108, 110, and 56 surrounding the shaft of the male threaded segment of each threaded coupling 112, 114, and 116.

In the embodiment shown in FIG. 6B, one or more of the conductive segments 106, 108, and 110 can be formed from aluminum and one or more of the conductive segments 106, 108, 110 can be formed from copper (like extension segment 60 in FIGS. 4C, 5C, and 6A). For example, any one of segments 106, 108, and 110 can be formed from copper, and the other segments can be formed from aluminum. Where a threaded coupling 112, 114, or 116 includes male or female threads made of copper, and mating female or male threads made of aluminum, one or both of the male and female threads of said threaded coupling can be silver, copper, or tin plated to facilitate good electrical connection therebetween.

Desirably, the internal Belleville washers 104 shown in FIGS. 4C, 5C, and 6A are used since, in practice, a majority of electrical current passes along the exterior surfaces of the conductors, contacts, or conductive segments (22, 24, 56, and 60) being coupled together. However, the use of external Belleville washers 118 shown in FIG. 6B is a viable alternative to the use of internal Belleville washers 104. Moreover, the mixed use of internal Belleville washers 104 and external Belleville washers 118 is envisioned. For example, without limitation, one threaded coupling 64 or 66 in FIGS. 4C and 5C can include internal Belleville washers 104 while the other threaded coupling 66 or 64 can use external Belleville washers 118.

Figure 7A:
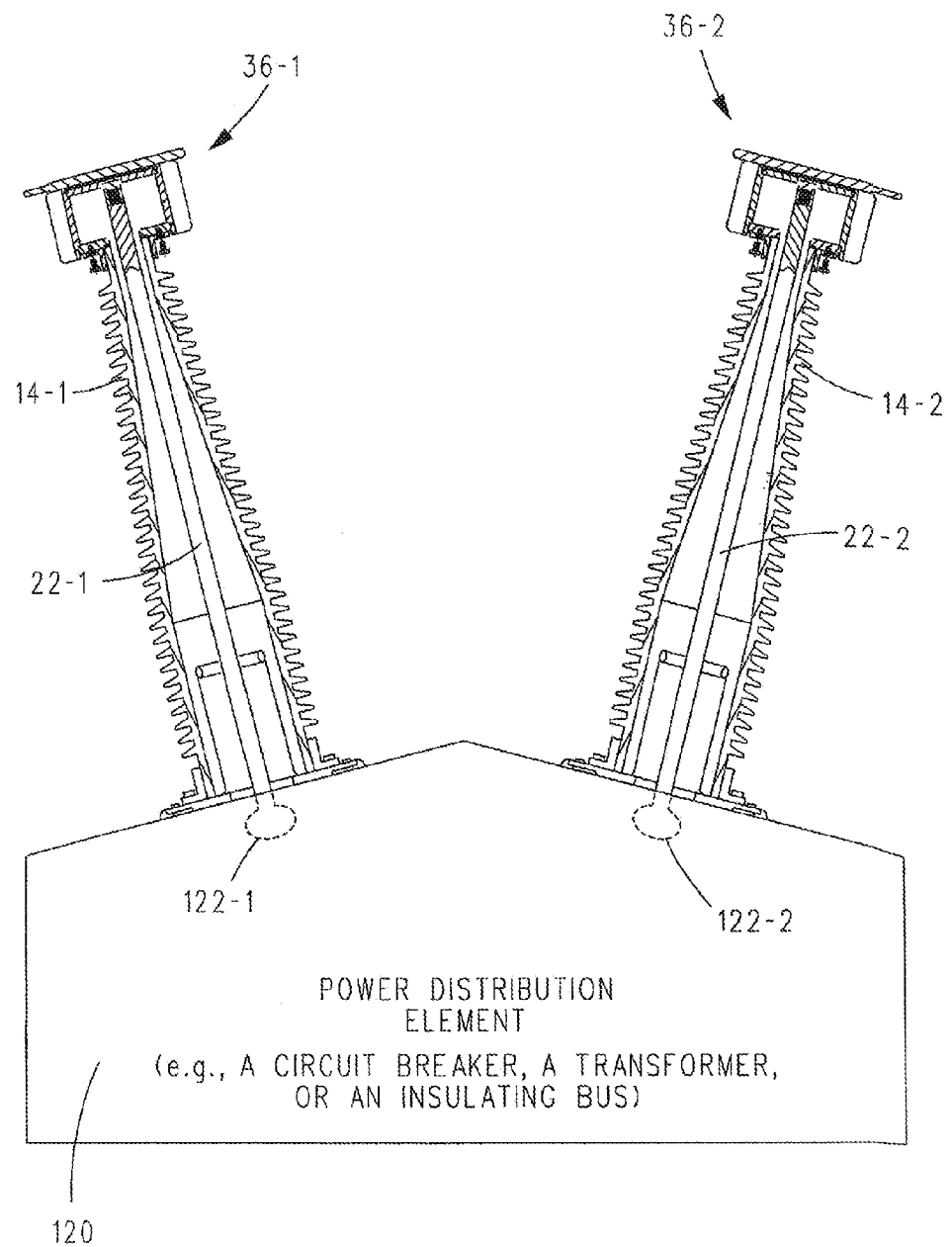
FIGS. 7A and 7B are isolated, cross-sectional views of the bushings, terminal pads and first and second embodiment radiators of FIGS. 4B and 5B coupled to blocks representing generic electrical power distribution elements, such as, without limitation, a transformer or an insulated bus.
Figure 7B:
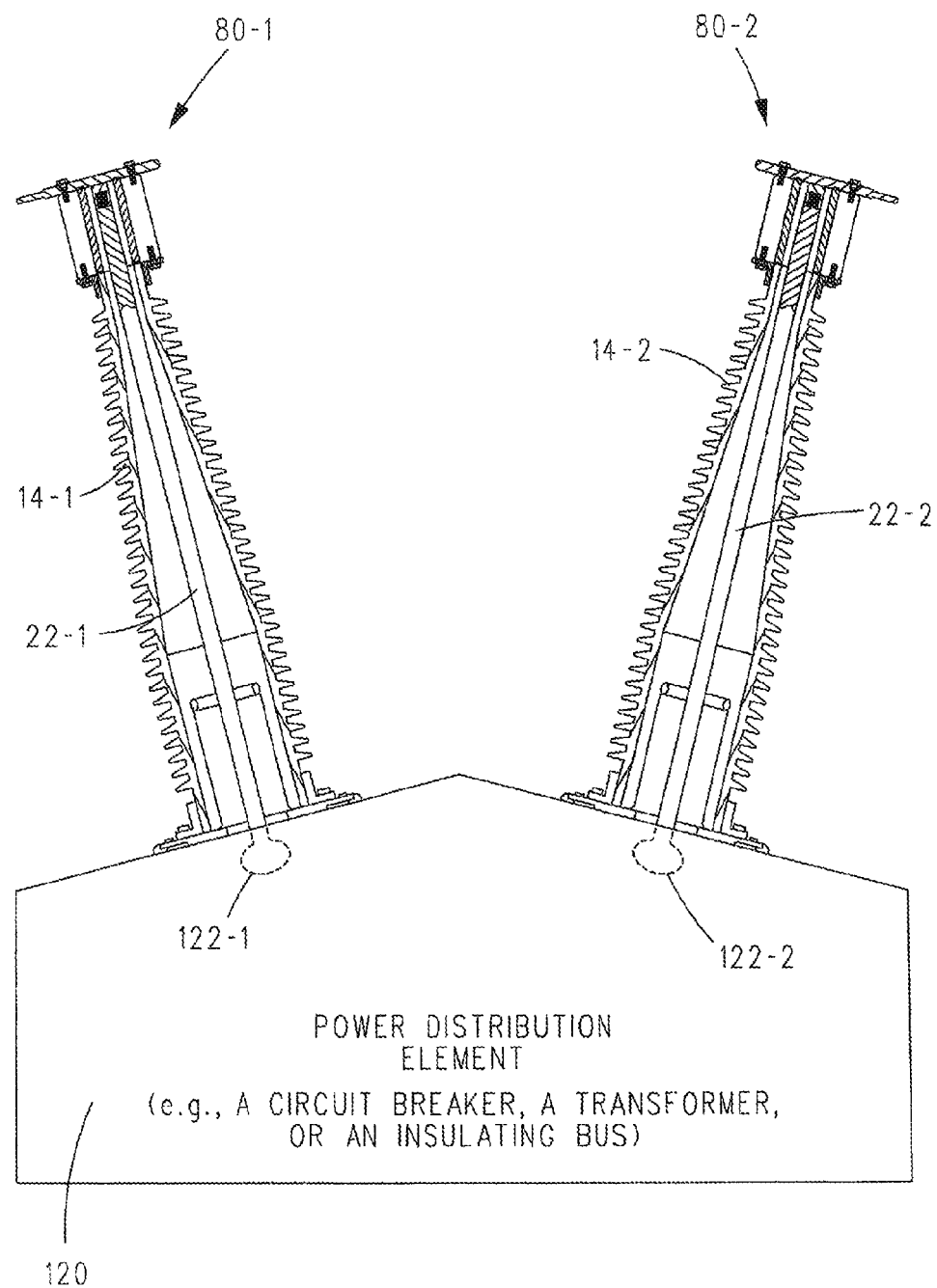

The invention has been described with reference to the accompanying figures. Obvious modifications and alterations will occur to others upon reading and understanding the preceding detailed description. For example, each set of (one or more) Belleville washers can be replaced with one or more coiled spring. Moreover, as shown in FIGS. 7A and 7B, each embodiment extruded radiator 36 and 80 can be utilized on the distal end of an insulating bushing (e.g., without limitation, like insulating bushing 14) that is coupled at its proximal end to a contact 122 a different type (different than circuit breaker 4 discussed above) of power distribution element 120, such as an oil or $SF_6$ filled transformer, or an oil or $SF_6$ filled insulated bus, versus the main enclosure 6 shown herein. It is intended that the invention be construed as including all such modifications and alterations insofar as they come within the scope of the appended claims or the equivalents thereof.

The invention claimed is:

1. A circuit breaker designed for use with AC voltages greater than 30 kilovolts and AC currents greater than 400 amperes, the circuit breaker comprising:
   a main enclosure housing an interrupter that is electrically insulated from the main enclosure, wherein the interrupter is switchable between a closed state where first and second contacts of the interrupter are electrically connected defining a conductive path for current to flow between the first and second contacts and an open state where the first and second contacts of the interrupter are electrically isolated from each other, and vice versa;
   first and second electrically insulating bushings having proximal ends coupled to the main enclosure;
   first and second conductors disposed inside of the first and second bushings, wherein proximal ends of the first and second conductors are electrically connected to the first and second contacts of the interrupter defining a conductive path for current to flow between the first and second contacts and the first and second conductors, respectively; and
   first and second terminal pads coupled between distal ends of the first and second bushings and distal ends of the first and second conductors disposed inside of the first and second bushings, respectively, wherein:
      at least one conductor includes first and second segments;
      a first end of the first segment is electrically connected to one of the contacts of the interrupter;
      a first end of the second segment is electrically connected to one of the terminal pads;
      a second end of the first segment is coupled to a second end of the second segment; and
      a biasing element is interposed between the second ends of the first and second segments, wherein the biasing element is operative for biasing the first end of the first segment toward the contact of the interrupter and for biasing the first end of the second segment toward the one terminal pad, wherein the biasing element includes a Belleville washer (a coned-disc spring, a conical spring washer, a disc spring, a Belleville spring, or a cupped spring washer) or a coiled spring.

2. The circuit breaker of claim 1, wherein including first and second radiators coupled between the distal ends of the first and second bushings and the first and second terminal pads, respectively, wherein at least a portion of the first or second segment of the one conductor is disposed inside one of the radiators.

3. The circuit breaker of claim 1, wherein the second ends of the first and second segments are coupled together via male threads of one segment threadedly engaged in female threads of the other segment.

4. The circuit breaker of claim 3, wherein
   one segment is made from aluminum;
   the other segment is made from copper; and
   at least one of the male threads and the female threads is silver, copper, or tin plated.

5. The circuit breaker of claim 1, wherein:
   the first end of the first segment is coupled directly to the contact of the interrupter; and
   the first end of the second segment is coupled directly to the one terminal pad.

6. The circuit breaker of claim 1, wherein the biasing element includes a pair of Belleville washers connected in series or in parallel.

7. The circuit breaker of claim 1, wherein the at least one conductor further includes a third segment coupled with the first segment, with the second segment, or with both of the first and second segments.

8. A circuit breaker, or transformer, or insulated bus designed for use with AC voltages greater than 30 kilovolts and AC currents greater than 400 amperes, the circuit breaker, or transformer, or insulated bus comprising:
    an elongated bushing made from electrically insulating material and having first and second ends, the first end of the bushing coupled to a main enclosure;
    a terminal pad coupled to the second end of the bushing; and
    a conductor disposed in an internal cavity of the bushing in spaced relation to an internal wall of the bushing that defines the internal cavity, wherein:
    the conductor includes first and second segments;
        a first end of the first segment is electrically connected to a contact;
        a first end of the second segment is electrically connected to the terminal pad;
        a second end of the first segment is coupled to a second end of the second segment; and
        a biasing element is interposed between the second ends of the first and second segments, wherein the biasing element is operative for biasing the first end of the first segment toward the contact and for biasing the first end of the second segment toward the terminal pad, wherein the biasing element includes a Belleville washer (a coned-disc spring, a conical spring washer, a disc spring, a Belleville spring, or a cupped spring washer) or a coiled spring.

9. The circuit breaker, or transformer, or insulated bus of claim 8, wherein:
    the first end of the first segment is coupled directly to the contact; and
    the first end of the second segment is coupled directly to the one terminal pad.

10. The circuit breaker, or transformer, or insulated bus of claim 8, wherein the second ends of the first and second segments are coupled together via male threads of one segment threadedly engaged in female threads of the other segment.

11. The circuit breaker, or transformer, or insulated bus of claim 10, wherein
    one segment is made from aluminum;
    the other segment is made from copper; and
    at least one of the male threads and the female threads is silver, copper, or tin plated.

12. The circuit breaker, or transformer, or insulated bus of claim 8, wherein the biasing element includes a pair of Belleville washers connected in series or in parallel.

13. The circuit breaker, or transformer, or insulated bus of claim 8, wherein the conductor further includes a third segment coupled with the first segment, with the second segment, or with both of the first and second segments.

14. The circuit breaker, or transformer, or insulated bus of claim 8, further including an elongated radiator disposed between the second end of the bushing and the terminal pad, wherein at least a portion of the first or second segment of the conductor is disposed inside of the radiator.

* * * * *